(12) United States Patent
Isozaki et al.

(10) Patent No.: US 8,338,513 B2
(45) Date of Patent: *Dec. 25, 2012

(54) POLYCARBONATE RESIN COMPOSITION, POLYCARBONATE RESIN MOLDED ARTICLE, AND METHOD FOR PRODUCING THE SAME

(75) Inventors: Toshio Isozaki, Chiba (JP); Kouji Satou, Chiba (JP)

(73) Assignee: Idemitsu Kosan Co., Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/739,548

(22) PCT Filed: Oct. 7, 2008

(86) PCT No.: PCT/JP2008/068205
§ 371 (c)(1),
(2), (4) Date: Jun. 23, 2010

(87) PCT Pub. No.: WO2009/054257
PCT Pub. Date: Apr. 30, 2009

(65) Prior Publication Data
US 2010/0256279 A1      Oct. 7, 2010

(30) Foreign Application Priority Data
Oct. 25, 2007   (JP) .................................. 2007-278058

(51) Int. Cl.
C08K 5/42        (2006.01)
C08K 3/40        (2006.01)

(52) U.S. Cl. ........ 524/165; 523/200; 524/420; 524/439; 524/449; 524/492; 524/537

(58) Field of Classification Search .................. 523/200; 524/394, 492, 439, 449, 165, 420, 537
See application file for complete search history.

(56) References Cited

U.S. PATENT DOCUMENTS

| | | | |
|---|---|---|---|
| 5,449,710 A * | 9/1995 | Umeda et al. .................. | 524/165 |
| 6,448,365 B1 * | 9/2002 | Funakoshi et al. ............. | 528/196 |
| 6,995,211 B2 * | 2/2006 | Nodera et al. ................. | 525/101 |
| 2006/0020075 A1 | 1/2006 | Basham et al. | |
| 2007/0112123 A1 | 5/2007 | Sekine | |
| 2007/0179237 A1 * | 8/2007 | Sekine ........................... | 524/492 |
| 2010/0028640 A1 | 2/2010 | Isozaki et al. | |
| 2010/0267880 A1 * | 10/2010 | Isozaki et al. ................ | 524/420 |

FOREIGN PATENT DOCUMENTS

| | | |
|---|---|---|
| JP | 5 155638 | 6/1993 |
| JP | 6 212068 | 8/1994 |
| JP | 7 118514 | 5/1995 |
| JP | 9 165506 | 6/1997 |
| JP | 2002 521547 | 7/2002 |
| JP | 2006 169324 | 6/2006 |
| JP | 2006 249291 | 9/2006 |
| JP | 2007 153729 | 6/2007 |
| WO | WO 2005110695 A1 * | 11/2005 |
| WO | 2006 012466 | 2/2006 |
| WO | 2008 047672 | 4/2008 |
| WO | 2008 047673 | 4/2008 |

OTHER PUBLICATIONS

Machine translation of JP 06-212068 A, Aug. 2, 1994.*
U.S. Appl. No. 12/742,310, filed May 11, 2010, Isozaki, et al.
U.S. Appl. No. 12/745,170, filed May 27, 2010, Isozaki, et al.
U.S. Appl. No. 12/739,448, filed Jul. 2, 2010, Isozaki, et al.
U.S. Appl. No. 12/445,739, filed Apr. 16, 2009, Isozaki, et al.
U.S. Appl. No. 12/445,688, filed Apr. 15, 2009, Isozaki, et al.
U.S. Appl. No. 12/747,688, filed Jun. 11, 2010, Isozaki, et al.
U.S. Appl. No. 12/747,704, filed Jun. 11, 2010, Isozaki, et al.

* cited by examiner

Primary Examiner — Vickey Nerangis
(74) Attorney, Agent, or Firm — Oblon, Spivak, McClelland, Maier & Neustadt, L.L.P.

(57) ABSTRACT

Disclosed are a polycarbonate resin composition comprising, with respect to 100 parts by mass of a composition composed of (A) 60 to 90 parts by mass of an aromatic polycarbonate resin and (B) 40 to 10 parts by mass of a glass filler having a refractive index smaller or larger than a refractive index of the aromatic polycarbonate resin by 0.002 or less, (C) 0.05 to 2.0 parts by mass of a silicone compound having a reactive functional group, (D) 0.03 to 1.0 part by mass of an organic alkali metal salt compound and/or an organic alkaline earth metal salt compound, (E) 0.05 to 7.0 parts by mass of glossy particles, and (F) 0.0001 to 3 parts by mass of a colorant, a polycarbonate resin molded article obtained by molding the composition, and a method for producing the molded article by molding the polycarbonate resin composition. Provided are a polycarbonate resin composition containing a glass filler, which is excellent in transparency, strength, and heat resistance, and provided with high flame retardancy, a polycarbonate resin molded article obtained by molding the resin composition, and a method of producing the molded article.

17 Claims, No Drawings

POLYCARBONATE RESIN COMPOSITION, POLYCARBONATE RESIN MOLDED ARTICLE, AND METHOD FOR PRODUCING THE SAME

TECHNICAL FIELD

The present invention relates to a polycarbonate resin composition, a polycarbonate resin molded article using the composition, and a method of producing the molded article, and more specifically, to a polycarbonate resin composition containing a glass filler, which is excellent in metallic external appearance, strength, and heat resistance, and provided with high flame retardancy, a polycarbonate resin molded article obtained by molding the resin composition, and a method of producing the molded article.

BACKGROUND ART

Polycarbonate resin molded articles have been widely used as, for example, industrial transparent materials in the fields of electricity and electronics, machinery, automobiles, and the like or optical materials for lenses, optical disks, and the like because each of the articles is excellent in transparency and mechanical strength. When an additionally high mechanical strength is needed, a glass filler or the like is added to each of the articles to strengthen the article.

Glass fibers each constituted of glass generally called an E glass have been used as the glass filler. However, the refractive index of the E glass at a sodium D line (nD, hereinafter simply referred to as "refractive index") is somewhat small, specifically, about 1.555, though, the refractive index of a polycarbonate resin is 1.580 to 1.590. Accordingly, when the glass filler is added to a polycarbonate resin composition in an amount needed for an increase in mechanical strength of the composition, the following problem arises: the resultant E glass-reinforced polycarbonate resin composition cannot maintain its transparency owing to a difference in refractive index between the filler and the polycarbonate resin of which the composition is formed, with the result that the composition becomes opaque.

Although a large number of patents each concerning a resin composition having a metallic external appearance or galactic external appearance (glittering pattern like the night sky studded with stars) have been filed, each of these patents discloses a resin composition using a transparent resin, and none of the patents describes a glass filler-reinforced resin. This is because of the following reason: when the resin to which glossy particles are added in order that a metallic external appearance or galactic external appearance may be obtained is not the transparent resin, only the glossy particles near the surface of a molded article are seen, so neither a metallic external appearance nor a galactic external appearance can be obtained.

To solve such problem, investigation has been conducted on, for example, a reduction in refractive index of a polycarbonate resin by the improvement of the resin or an increase in refractive index of a glass filler by the improvement of the composition of the glass filler.

For example, (1) a composition containing a polycarbonate resin composition using a product of a reaction between a hydroxyaralkyl alcohol and lactone as a terminal stopper and a glass filler having a refractive index smaller or larger than that of the polycarbonate resin composition by 0.01 or less (see Patent Document 1), (2) a composition composed of a polycarbonate resin, a glass filler having a refractive index smaller or larger than that of the polycarbonate resin by 0.015 or less, and polycaprolactone (see Patent Document 2), (3) a glass composition obtained by incorporating, for example, $ZrO_2$, $TiO_2$, BaO, and ZnO into a glass filler composition at a specific ratio so that the refractive index of the composition is close to that of a polycarbonate resin (see Patent Document 3), and (4) a glass filler-reinforced polycarbonate resin composition having a metallic external appearance (see Patent Document 4) have been proposed.

However, the polycarbonate resin composition in the above section (1) is not practical because of the following reasons: when the glass filler is added in an amount needed for an increase in mechanical strength of the composition, the difference in refractive index at such level is not small enough for the addition to exert its effect, and the glass filler is too expensive to be used as a raw material for the production of the polycarbonate resin composition.

The polycarbonate resin composition in the above section (2) involves the following problem: reductions in heat resistance and mechanical properties of the composition are inevitable owing to the presence of polycaprolactone, though, the composition can maintain its transparency even when the glass filler has a refractive index smaller or larger than that of the polycarbonate resin by 0.015 or less.

Unless the content of each of, for example, $ZrO2$, $TiO2$, BaO, and ZnO in the glass composition in the above section (3) is appropriately adjusted, the glass filler composition will devitrify. As a result, even when the glass filler composition has a refractive index equal to that of the polycarbonate resin, a polycarbonate resin composition containing the glass filler composition may be unable to obtain transparency. In addition, the significance of the use of a glass filler-reinforced polycarbonate resin composition for the purpose of a weight reduction wanes because the specific gravity of the glass filler itself increases.

Further, the document disclosing the polycarbonate resin composition in the above section (4) does not refer to flame retardancy. Accordingly, unless flame retardancy is imparted to the composition, fields where the composition can be used will be limited.

Patent Document 1: JP H07-118514 A
Patent Document 2: JP H09-165506 A
Patent Document 3: JP H05-155638 A
Patent Document 4: JP H06-212068 A

DISCLOSURE OF THE INVENTION

Problems to be Solved by the Invention

In view of such circumstances, an object of the present invention is to provide a polycarbonate resin composition containing a glass filler, which is excellent in metallic external appearance, strength, and heat resistance, and provided with high flame retardancy, a polycarbonate resin molded article obtained by molding the resin composition, and a method of producing the molded article.

MEANS FOR SOLVING THE PROBLEMS

The inventors of the present invention have made extensive studies with a view to achieving the object. As a result, the inventors have found that the object can be achieved with a flame-retardant polycarbonate resin composition having the following properties and a polycarbonate resin molded article obtained by molding the resin composition: the composition contains an aromatic polycarbonate resin, a glass filler having a refractive index smaller or larger than that of the resin by 0.002 or less, a silicone compound having a reactive functional group, an organic alkali metal salt compound and/or an organic alkaline earth metal salt compound, glossy particles, and a colorant at a predetermined ratio, and has a predetermined flame-retardant grade. The present invention has been completed on the basis of such finding.

Specifically, the present invention is to provide the following:

(1) a polycarbonate resin composition comprising, with respect to 100 parts by mass of a composition composed of (A) 60 to 90 parts by mass of an aromatic polycarbonate resin and (B) 40 to 10 parts by mass of a glass filler having a refractive index smaller or larger than a refractive index of the aromatic polycarbonate resin by 0.002 or less, (C) 0.05 to 2.0 parts by mass of a silicone compound having a reactive functional group, (D) 0.03 to 1.0 part by mass of an organic alkali metal salt compound and/or an organic alkaline earth metal salt compound, (E) 0.05 to 7.0 parts by mass of glossy particles, and (F) 0.0001 to 3 parts by mass of a colorant;

(2) the polycarbonate resin composition according to the above item (1), wherein the glass filler as the component (B) comprises glass fibers and/or milled fibers;

(3) the polycarbonate resin composition according to the above item (1) or (2), wherein the refractive index of the glass filler as the component (B) is 1.584 to 1.586;

(4) a polycarbonate resin composition, wherein the glossy particles as the component (E) comprise one or two or more kinds selected from the group consisting of mica, metal particles, metal sulfide particles, particles each having a surface coated with a metal or a metal oxide, and glass flakes each having a surface coated with a metal or a metal oxide;

(5) a polycarbonate resin molded article obtained by molding the polycarbonate resin composition according to any one of the above items (1) to (4);

(6) the polycarbonate resin molded article according to the above item (5), herein the polycarbonate resin molded article is obtained by injection molding at a mold temperature of 120° C. or higher;

(7) the polycarbonate resin molded article according to the above item (5) or (6), wherein the polycarbonate resin molded article has a 60° specular gloss of 80 or more and a total light transmittance for visible light of 40% or more;

(8) a polycarbonate resin molded article according to any one of the above items (5) to (7), wherein the polycarbonate resin molded article has a flame retardancy determined by a flame retardancy evaluation method in conformance with UL94 of 1.5 mmV-0; and (9) A method of producing a polycarbonate resin molded article comprising subjecting the polycarbonate resin composition according to any one of the above items of (1) to (4) to injection molding at a mold temperature of 120° C. or higher.

EFFECTS BY THE INVENTION

According to the present invention, there can be provided a polycarbonate resin composition containing a glass filler, which is excellent in transparency, strength, and heat resistance, and provided with high flame retardancy, a polycarbonate resin molded article obtained by molding the resin composition, and a method of producing the molded article.

BEST MODE FOR CARRYING OUT THE INVENTION

A polycarbonate resin (hereinafter abbreviated to "PC resin") composition of the present invention comprises, with respect to 100 parts by mass of a composition composed of (A) 60 to 90 parts by mass of an aromatic PC resin and (B) 40 to 10 parts by mass of a glass filler having a refractive index smaller or larger than a refractive index of the aromatic PC resin by 0.002 or less, (C) 0.05 to 2.0 parts by mass of a silicone compound having a reactive functional group, (D) 0.03 to 1.0 part by mass of an organic alkali metal salt compound and/or an organic alkaline earth metal salt compound, (E) 0.05 to 7.0 parts by mass of glossy particles, and (F) 0.0001 to 3 parts by mass of a colorant.

In the PC resin molded article of the present invention, a flame retardancy determined by a flame retardancy evaluation method in conformance with UL94 can be 1.5 mmV-0.

To be specific, in the PC resin composition of the present invention, an aromatic polycarbonate resin produced by a reaction between a dihydric phenol and a carbonate precursor can be used as the aromatic polycarbonate resin as the component (A).

A method of producing the PC resin as the component (A) is not particularly limited, and resins produced by various conventionally known methods can each be used as the PC resin. For example, a resin produced from a dihydric phenol and a carbonate precursor by a solution method (interfacial polycondensation method) or a melt method (ester exchange method), that is, a resin produced by, for example, an interfacial polycondensation method involving causing the dihydric phenol and phosgene to react with each other in the presence of a terminal stopper or an ester exchange method involving causing the dihydric phenol and diphenyl carbonate or the like to react with each other in the presence of a terminal stopper can be used.

As the dihydric phenol, various examples are given. In particular, examples thereof include 2,2-bis(4-hydroxyphenyl)propane [bisphenol A], bis(4-hydroxyphenyl)methane, 1,1-bis(4-hydroxyphenyl)ethane, and 2,2-bis(3,5-dimethyl-4-hydroxyphenyl)propane, 4,4'-dihydroxydiphenyl, bis(4-hydroxyphenyl)cycloalkane, bis(4-hydroxyphenyl)oxide, bis(4-hydroxyphenyl)sulfide, bis(4-hydroxyphenyl)sulfone, bis(4-hydroxyphenyl)sulfoxide, and bis(4-hydroxyphenyl)ketone. In addition, hydroquinone, resorcin, and catechol can be also exemplified. One kind of those dihydric phenols may be used alone, or two or more kinds thereof may be used in combination. Of those, bis(hydroxyphenyl)alkanes are preferred, and bisphenol A is particularly preferred.

On the other hand, as the carbonate precursor, a carbonyl halide, carbonyl ester, or a haloformate, and the like are given. Specifically, phosgene, dihaloformate of a dihydricphenol, diphenyl carbonate, dimethyl carbonate, and diethyl carbonate are given.

It should be noted that the PC resin may have a branched structure. As a branching agent, 1,1,1-tris(4-hydroxyphenyl)ethane, α, α', α"-tris(4-hydroxyphenyl)-1,3,5-triisopropylbenzene, phloroglycine, trimellitic acid, isatinbis(o-cresol), and the like are exemplified.

In the present invention, a viscosity average molecular weight (Mv) of PC resin used as (A) component is generally 10,000 to 50,000, preferably 13,000 to 35,000, and more preferably 15,000 to 20,000.

The viscosity average molecular weight (Mv) is calculated by the following equation, after a limiting viscosity [η] is obtained by determining a viscosity of methylene chloride solution at 20° C. by using a Ubbelohde type viscometer.

$$[\eta] = 1.23 \times 10^{-5} Mv^{0.83}$$

A molecular terminal group in the aromatic PC resin as the component (A) is not particularly limited, and a monovalent, phenol-derived group as a conventionally known terminal stopper may be used; a monovalent, phenol-derived group having an alkyl group having 10 to 35 carbon atoms is preferred. When the molecular terminal is a phenol-derived group having an alkyl group having 10 or more carbon atoms, a flame-retardant PC resin composition to be obtained has good flowability. In addition, when the molecular terminal is a phenol-derived group having an alkyl group having 35 or less carbon atoms, the flame-retardant PC resin composition to be obtained has good heat resistance and good impact resistance.

Examples of the monovalent phenol including an alkyl group having 10 to 35 carbon atoms include decyl phenol, undecyl phenol, dodecyl phenol, tridecyl phenol, tetradecyl phenol, pentadecyl phenol, hexadecyl phenol, heptadecyl phenol, octadecyl phenol, nonadecyl phenol, icosyl phenol, docosyl phenol, tetracosyl phenol, hexacosyl phenol, octacosyl phenol, triacontyl phenol, dotriacontyl phenol, and pentatriacontyl phenol.

The alkyl group may be present at any one of the o-, m-, and p-positions of each of those alkyl phenols with respect to the hydroxyl group; the alkyl group is preferably present at the p-position. In addition, the alkyl group may be a linear group, a branched group, or a mixture of them.

At least one substituent of each of the alkyl phenols has only to be the alkyl group having 10 to 35 carbon atoms, and the other four substituents are not particularly limited; each of the other four substituents may be an alkyl group having 1 to 9 carbon atoms, an aryl group having 6 to 20 carbon atoms, or a halogen atom, or each of the alkyl phenols may be unsubstituted except for the hydroxyl group and the alkyl group having 10 to 35 carbon atoms.

Only one of the terminals of the PC resin may be sealed with a monovalent phenol having the alkyl group having 10 to 35 carbon atoms, or each of both the terminals may be sealed with the phenol. In addition, terminals each denatured with the phenol account for preferably 20% or more, or more preferably 50% or more of all terminals from the viewpoint of an improvement in flowability of the PC resin composition to be obtained.

That is, the other may each be sealed with a hydroxyl group terminal or any one of the other terminal stoppers in the following description.

Here, examples of the other terminal stoppers include phenol, p-cresol, p-tert-butylphenol, p-tert-octylphenol, p-cumylphenol, p-nonylphenol, p-tert-amylphenol, bromophenol, tribromophenol, and pentabromophenol, which are commonly used in the production of the PC resin.

Of those, a halogen-free compound is preferred in view of environmental issues.

In the PC resin composition of the present invention, the aromatic PC resin as the component (A) can appropriately contain, in addition to the PC resin, a copolymer such as a polyester-polycarbonate resin obtained by polymerizing polycarbonate in the presence of an ester precursor such as a bifunctional carboxylic acid such as terephthalic acid or an ester-forming derivative of the acid, or any other polycarbonate resin to such an extent that the object of the present invention is not impaired.

A difference between the refractive index of the glass filler to be used as the component (B) in the PC resin composition of the present invention and the refractive index of the aromatic PC resin as the component (A) in the PC resin composition must be 0.002 or less. When the difference in refractive index exceeds 0.002, the transparency of a molded article obtained by using the PC resin composition becomes insufficient. The difference in refractive index is preferably 0.001 or less; the refractive index of the glass filler is particularly preferably equal to that of the aromatic PC resin to be used as the component (A).

Glass of which such glass filler is constituted is, for example, a glass I or glass II having the following composition.

It is preferred that the glass I contains 50 to 60% by mass of silicone oxide ($SiO_2$), 10 to 15% by mass of aluminum oxide ($Al_2O_3$), 15 to 25% by mass of calcium oxide (CaO), 2 to 10% by mass of titanium oxide ($TiO_2$), 2 to 8% by mass of boron oxide ($B_2O_3$), 0 to 5% by mass of magnesium oxide (MgO), 0 to 5% by mass of zinc oxide (ZnO), 0 to 5% by mass of barium oxide (BaO), 0 to 5% by mass of zirconium oxide ($ZrO_2$), 0 to 2% by mass of lithium oxide ($LiO_2$), 0 to 2% by mass of sodium oxide ($Na_2O$), and 0 to 2% by mass of potassium oxide ($K_2O$), and has a total content of the lithium oxide ($LiO_2$), the sodium oxide ($Na_2O$), and the potassium oxide ($K_2O$) of 0 to 2% by mass.

On the other hand, it is preferred that the glass II contains 50 to 60% by mass of silicone oxide ($SiO_2$), 10 to 15% by mass of aluminum oxide ($Al_2O_3$), 15 to 25% by mass of calcium oxide (CaO), 2 to 5% by mass of titanium oxide ($TiO_2$), 0 to 5% by mass of magnesium oxide (MgO), 0 to 5% by mass of zinc oxide (ZnO), 0 to 5% by mass of barium oxide (BaO), 2 to 5% by mass of zirconium oxide ($ZrO_2$), 0 to 2% by mass of lithium oxide ($LiO_2$), 0 to 2% by mass of sodium oxide ($Na_2O$), and 0 to 2% by mass of potassium oxide ($K_2O$), be substantially free of boron oxide ($B_2O_3$), and has a total content of the lithium oxide ($LiO_2$), the sodium oxide ($Na_2O$), and the potassium oxide ($K_2O$) of 0 to 2% by mass.

The content of $SiO_2$ in each of the glass I and glass II is preferably 50 to 60% by mass from the viewpoints of the strength of the glass filler and solubility at the time of the production of each of the glasses. The content of $Al_2O_3$ is preferably 10 to 15% by mass from the viewpoints of the chemical durability of each of the glasses such as water resistance and solubility at the time of the production of each of the glasses. The content of CaO is preferably 15 to 25% by mass from the viewpoints of solubility at the time of the production of each of the glasses and the suppression of the crystallization of each of the glasses.

The glass I can contain 2 to 8% by mass of $B_2O_3$ like the E glass. In this case, the content of $TiO_2$ is preferably 2 to 10% by mass from the viewpoints of, for example, an improving effect on the refractive index of the glass and the suppression of the devitrification of the glass.

In addition, it is preferred that the glass II be substantially free of $B_2O_3$ like ECR glass composition, which is excellent in acid resistance and alkali resistance. In this case, the content of TiO2 is preferably 2 to 5% by mass from the viewpoint of the adjustment of the refractive index of the glass. In addition, the content of $ZrO_2$ is preferably 2 to 5% by mass from the viewpoints of an increase in refractive index of the glass, an improvement in chemical durability of the glass, and solubility at the time of the production of the glass.

In each of the glass I and glass II, MgO is an arbitrary component, and can be incorporated at a content of about 0 to 5% by mass from the viewpoints of an improvement in durability of each of the glasses such as a tensile strength and solubility at the time of the production of each of the glasses. In addition, ZnO and BaO are also arbitrary components, and each of them can be incorporated at a content of about 0 to 5% by mass from the viewpoints of an increase in refractive index of each of the glasses and the suppression of the devitrification of each of the glasses.

In the glass I, $ZrO_2$ is an arbitrary component, and can be incorporated at a content of about 0 to 5% by mass from the viewpoints of an increase in refractive index of the glass and solubility at the time of the production of the glass.

In each of the glass I and glass II, $Li_2O$, $Na_2O$, and $K_2O$ as alkali components are arbitrary components, and each of them can be incorporated at a content of about 0 to 2% by mass. In addition, the total content of the alkali components is preferably 0 to 2% by mass. When the total content is 2% by mass or less, a reduction in water resistance of each of the glasses can be suppressed.

As described above, each of the glass I and glass II contains a small amount of alkali components, so a reduction in molecular weight of the PC resin composition due to the decomposition of the aromatic PC resin as the component (A) can be suppressed, and reductions in physical properties of an article molded out of the PC resin composition can be prevented.

Each of the glass I and glass II may contain, in addition to the glass components, for example, an oxide containing an element such as lanthanum (La), yttrium (Y), gadolinium (Gd), bismuth (Bi), antimony (Sb), tantalum (Ta), niobium (Nb), or tungsten (W) as a component for increasing the refractive index of the glass to such an extent that the spinning property, water resistance, and the like of the glass are not adversely affected. In addition, each of the glasses may contain an oxide containing an element such as cobalt (Co), copper (Cu), or neodymium (Nd) as a component for discoloring the yellow color of the glass.

In addition, the content of $Fe_2O_3$ as an impurity on an oxide basis in the glass raw materials to be used in the production of each of the glass I and glass II is preferably less than 0.01% by mass with respect to the entirety of the glass in order that the coloring of the glass may be suppressed.

The glass filler as the component (B) in the PC resin composition of the present invention can be obtained by: appropriately choosing a glass having a refractive index smaller or larger than that of the aromatic polycarbonate resin as the component (A) to be used by 0.002 or less from the glass I and glass II each having the above-mentioned glass composition; and forming the chosen glass into a desired shape.

The shape of the glass filler is not particularly limited, and glass fillers of various shapes such as glass fibers, milled fibers, a glass powder, glass flakes, and glass beads can each be used. One kind of them may be used alone, or two or more kinds of them may be used in combination; the glass fibers and/or the milled fibers are suitable from the viewpoint of a balance among, for example, the mechanical strength, impact resistance, transparency, and moldability of a molded article to be finally obtained.

The glass fibers can be obtained by employing a conventionally known spinning method for glass long fibers. For example, glass can be turned into fibers by employing any one of the various methods such as: a direct melt (DM) method involving continuously turning glass raw materials into glass in a melting furnace, introducing the resultant glass into a forehearth, and spinning the glass by attaching a bushing to the bottom of the forehearth; and a remelting method involving processing molten glass into a marble-, cullet-, or rod-like shape, remelting the resultant, and spinning the resultant.

Although the diameter of each of the glass fibers is not particularly limited, fibers each having a diameter of about 3 to 25 µm are preferably used in ordinary cases. When the diameter is 3 µm or more, irregular reflection is suppressed, whereby a reduction in transparency of the molded article can be prevented. In addition, when the diameter is 25 µm or less, the molded article to be obtained has a good strength.

The milled fibers can be obtained by employing a conventionally known production method for milled fibers. For example, strands of glass fibers can be turned into milled fibers by being pulverized with a hammer mill or ball mill.

Although the fiber diameter and aspect ratio of each of the milled fibers are not particularly limited, milled fibers each having a fiber diameter of about 3 to 25 µm and an aspect ratio of about 2 to 150 are preferably used.

The glass powder can be obtained by a conventionally known production method. For example, a powder having a desired particle diameter can be obtained by: melting glass raw materials in a melting furnace; and loading the melt into water to water-granulate the melt or molding the melt into a sheet shape with a cooling roll and pulverizing the sheet. Although the particle diameter of the glass powder is not particularly limited, a glass powder having a particle diameter of about 1 to 100 µm is preferably used.

The glass flakes can be obtained by a conventionally known method. For example, flakes each having a desired aspect ratio can be obtained by: melting glass raw materials in a melting furnace; drawing the melt in a tubular shape to provide glass having a constant thickness; pulverizing the glass with a roll to provide a frit having a specific thickness; and pulverizing the frit. Although the thickness and aspect ratio of each of the glass flakes are not particularly limited, glass flakes each having a thickness of about 0.1 to 10 µm and an aspect ratio of about 5 to 150 are preferably used.

The glass beads can be obtained by a conventionally known production method. For example, glass beads each having a desired particle diameter can be obtained by: melting glass raw materials in a melting furnace; and spraying the melt with a burner. Although the particle diameter of each of the glass beads is not particularly limited, glass beads each having a particle diameter of about 5 to 300 µm are preferably used.

The surface of the glass filler is preferably treated with a coupling agent in order that the glass filler may show an increased affinity for the aromatic polycarbonate resin as the component (A), adhesiveness between the glass filler and the resin may be improved, and reductions in transparency and strength of the molded article due to the formation of voids in the glass filler may be suppressed.

A silane-based coupling agent, a borane-based coupling agent, an aluminate-based coupling agent, a titanate-based coupling agent, or the like can be used as the coupling agent. The silane-based coupling agent is particularly preferably used because adhesiveness between the aromatic PC resin and the glass filler can be improved.

Specific examples of the silane-based coupling agent include triethoxy silane, vinyltris(β-methoxyethoxy)silane, γ-methacryloxypropyl trimethoxy silane, γ-glycidoxypropyl trimethoxy silane, β-(1,1-epoxycyclohexyl)nithyltrimethoxy silane, β-(3,4-epoxycyclohexyl)ethyl trimethoxy silane, N-β-(aminoethyl)-γ-aminopropyl trimethoxy silane, N-β-(aminoethyl)-γ-aminopropylmethyl dimethoxyl silane, γ-aminopropyl triethoxy silane, N-phenyl-γ-aminopropyl trimethoxy silane, γ-mercapto propyl trimethoxy silane, γ-chloropropyl trimethoxy silane, γ-aminopropyl trimethoxy silane, γ-aminopropyl tris(2-methoxy-ethoxy) silane, N-methyl-γ-aminopropyl trimethoxy silane, N-vinylbenzyl-γ-aminopropyl triethoxy silane, triaminopropyl trimethoxy silane, 3-ureidepropyl trimethoxy silane, 3-(4,5-dihydroimidazolyl) propyl triethoxy silane, hexamethyl disilazane, N,O-(bistrimethylsilyl)amide, and N,N-bis(trimethylsilyl)urea. Of those, preferred are amino silanes and epoxysilanes such as γ-aminopropyl trimethoxy silane, N-β-(aminoethyl)-γ-aminopropyl trimethoxy silane, γ-glycidoxypropyl trimethoxy silane, and β-(3,4-epoxycyclohexyl)ethyl trimethoxy silane.

The surface of the glass filler can be treated with such coupling agent by an ordinary known method without any particular limitation. The surface treatment can be performed by an appropriate method depending on the shape of the filler; examples of the method include a sizing treatment method involving applying a solution or suspension of the above coupling agent in an organic solvent as the so-called sizing agent to the glass filler, a dry mixing method involving the use of a Henschel mixer, a super mixer, a Redige mixer, a V-type blender, or the like, a spray method, an integral blend method, and a dry concentrate method. The surface treatment is desirably performed by the sizing treatment method, the dry mixing method, or the spray method.

The PC resin composition of the present invention must contain the aromatic polycarbonate resin as the component (A) in an amount of 60 to 90 parts by mass and the glass filler as the component (B) in an amount of 40 to 10 parts by mass on the basis of the total amount of the components (A) and (B), i.e., 100 parts by mass. When the content of the component (B) is less than 10 parts by mass, the component does not sufficiently exert an improving effect on the rigidity of the composition. In addition, when the content exceeds 40 parts by mass, the specific gravity of the composition increases, and the impact resistance of the composition reduces. The content of the component (A) and the content of the component (B) are preferably 70 to 90 parts by mass and 30 to 10 parts by mass, respectively, from the viewpoints of, for example, the rigidity, the impact resistance, and the specific gravity.

The silicone compound having a reactive functional group is added as the component (C) to the PC resin composition of the present invention for the purpose of, for example, an additional improvement in flame retardancy of the composition.

Examples of the silicone compound having a reactive functional group as the component (C) (which may hereinafter be referred to as "reactive functional group-containing silicone compound") include polyorganosiloxane polymers and/or copolymers each having a basic structure represented by a general formula (1).

In the general formula (1), R1 represents a reactive functional group. Examples of the functional group include an alkoxy group, an aryloxy group, a polyoxyalkylene group, a hydrogen group, a hydroxy group, a carboxy group, a silanol group, an amino group, a marcapto group, an epoxy group, and a vinyl group. Of those, preferred are the alkoxy group, the hydroxy group, the hydrogen group, the epoxy group, and the vinyl group.

R2 represents a hydrocarbon group having 1 to 12 carbon atoms. Examples of the hydrocarbon group include a linear or branched alkyl group having 1 to 12 carbon atoms, a cycloalkyl group having 5 to 12 carbon atoms, an aryl group having 6 to 12 carbon atoms, and an aralkyl group having 7 to 12 carbon atoms. Specific examples thereof include a methyl group, an ethyl group, an n-propyl group, an isopropyl group, various butyl groups, various pentyl groups, various hexyl groups, various octyl groups, a cyclopentyl group, a cyclohexyl group, a phenyl group, a tolyl group, a xylyl group, a benzyl group, and a phenetyl group.

a and b represent a number satisfying relationships of $0 < a \leq 3$, $0 < b \leq 3$, and $0 < a+b \leq 3$. When multiple R1's are present, the multiple R1's may be the same or different from one another. When multiple R2's are present, the multiple R2's may be the same or different from one another.

In the present invention, polyorganosiloxane polymers and/or copolymers each having multiple reactive functional groups of the same kind, and polyorganosiloxane polymers and/or copolymers each having multiple reactive functional groups of different kinds can be used in combination.

The polyorganosiloxane polymers and/or copolymers each having the basic structure represented by the general formula (1) each have a ratio of the number of its reactive functional groups ($R^1$) to the number of its hydrocarbon groups ($R^2$) of typically about 0.1 to 3, or preferably about 0.3 to 2. In addition, such reactive functional group-containing silicone compound has a refractive index of preferably 1.45 to 1.65, or more preferably 1.48 to 1.60 in order that the translucency of the PC resin composition at the time of the addition of the compound may be held.

Such reactive functional group-containing silicone compound, which is a liquid, powder, or the like, preferably shows good dispersibility in melting and mixing. For example, a liquid compound having a viscosity at room temperature of about 10 to 500,000 mm2/s can be used.

The PC resin composition of the present invention has the following properties: even when the reactive functional group-containing silicone compound is a liquid, the compound is uniformly dispersed in the composition, and bleeds at the time of molding or to the surface of the molded article to a small extent.

The reactive functional group-containing silicone compound as the component (C) must be incorporated into the PC resin composition of the present invention at a content of 0.05 to 2.0 parts by mass with respect to 100 parts by mass of the composition composed of the aromatic PC resin as the component (A) and the glass filler as the component (B). When the content of the component (C) is less than 0.05 part by mass, a preventing effect on dripping at the time of the combustion of the composition is insufficient. In addition, when the content exceeds 2.0 parts by mass, a screw starts to slide at the time of the kneading of the raw materials for the composition, so the raw materials cannot be successfully fed, and the ability of an apparatus including the screw to produce the composition reduces. The content of the component (C) is preferably 0.1 to 1.0 part by mass, or more preferably 0.2 to 0.8 part by mass from the viewpoints of the prevention of the dripping and productivity.

The organic alkali metal salt compound and/or the organic alkaline earth metal salt compound as the component (D) are/is added to the PC resin composition of the present invention for the purpose of, for example, imparting flame retardancy to the composition. Various compounds can be given as examples of the organic alkali metal salt compound and/or the organic alkaline earth metal salt compound; an alkali metal salt or alkaline earth metal salt of an organic acid or organic ester having at least one carbon atom is typically used.

Here, examples of the organic acid and organic acid ester include organic sulfonic acid, organic carboxylic acid, and polystyrene sulfonic acid. On the other hand, examples of the alkali metal include sodium, potassium, lithium, and cesium. Examples of the alkaline earth metal include magnesium, calcium, strontium, and barium. Of those, the salt of sodium, potassium, or cesium is preferably used. In addition, the salt of the organic acid may be substituted by a halogen atom such as fluorine, chlorine, or bromine.

An alkali metal salt compound or alkaline earth metal salt compound of a perfluoroalkanesulfonic acid represented by a general formula (2) is preferably used as an alkali metal salt compound or alkaline earth metal salt compound of an organic sulfonic acid out of the various organic alkali metal salt compounds and organic alkaline earth metal salt compounds:

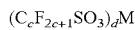 (2)

where c represents an integer of 1 to 10, M represents an alkali metal such as lithium, sodium, potassium, or cesium, or an alkaline earth metal such as magnesium, calcium, strontium, or barium, and d represents the valence of M.

A compound described in, for example, Japanese Examined Patent Publication No. Sho 47-40445 corresponds to such compound.

In the general formula (2), examples of the perfluoroalkane sulfonic acid include perfluoromethane sulfonate, perfluoroethane sulfonate, perfluoropropane sulfonate, perfluorobutane sulfonate, perfluoromethyl butane sulfonate, perfluorohexane sulfonate, perfluoroheptane sulfonate, and perfluorooctane sulfonate. In particular, potassium salts thereof are preferably used.

In addition, examples thereof include alkyl sulfonate, benzene sulfonate, alkylbenzene sulfonate, diphenyl sulfonate, naphthalene sulfonate, 2,5-dichlorobenzene sulfonate, 2,4,5-trichlorobenzene sulfonate, diphenylsulfone-3-sulfonate, diphenylsulfone-3,3'-disulfonate, naphthalene trisulfonate, fluoro-derivatives thereof, and alkali metal salts or alkaline earth metal salts of organic sulfonic acids such as polystyrene sulfonate.

Next, as the alkali metal salt compounds and/or alkaline earth metal salt compounds of polystyrene sulfonic acid, a sulfonate group-containing aromatic vinyl-based resin represented by a general formula (3) is exemplified:

[Chemical Formula 1]

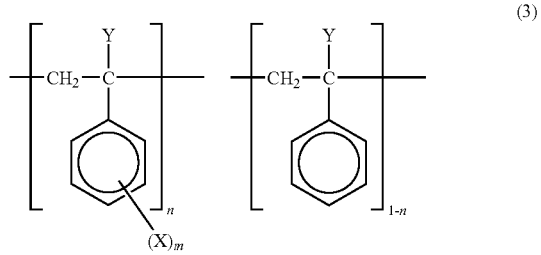

(3)

In the Formula, X represents a sulfonate group; m represents 1 to 5; Y represents a hydrogen atom, a hydrocarbon group having 1 to 10 carbon atoms; and n represents a mole fraction and n satisfies the following formula, $0 < n \leq 1$.

Here, the sulfonate group is an alkali metal salt and/or an alkaline earth metal salt of sulfonic acid. In addition, as the metal, sodium, potassium, lithium, rubidium, cesium, berylium, magnesium, calcium, strontium, and barium are exemplified.

It should be noted that Y represents a hydrogen atom or a hydrocarbon group having 1 to 10 carbon atoms, or preferably represents a hydrogen atom or a methyl group. m represents 1 to 5, and n satisfies the relationship of $0 < n \leq 1$. That is, each aromatic ring may be substituted with the sulfonate group (X) at each of all the five positions, may be substituted with the group at each of part of the positions, or may be unsubstituted except for one position.

In order that the PC resin composition of the present invention may obtain flame retardancy, the ratio at which the aromatic rings are substituted with the sulfonate groups is determined in consideration of, for example, the content of the sulfonate group-containing aromatic vinyl-based resin, and is not particularly limited; the substitution ratio of the resin to be generally used is 10 to 100%.

It should be noted that the sulfonate group-containing aromatic vinyl-based resin in the category of the alkali metal salt and/or alkaline earth metal salt of polystyrene sulfonic acid is not limited to a sulfonate group-containing aromatic vinyl-based resin represented by the general formula (3), and may be a copolymer of a styrene-based monomer and any other copolymerizable monomer.

Here, a method of producing the sulfonate group-containing aromatic vinyl-based resin is, for example, (a) a method involving polymerizing the aromatic vinyl-based monomers each having a sulfonic group and the like or copolymerizing any such monomer and any other copolymerizable monomer, or (b) a method involving sulfonating an aromatic vinyl-based polymer, a copolymer of an aromatic vinyl-based monomer and any other copolymerizable monomer, or a mixture of these polymers and neutralizing the resultant with an alkali metal and/or an alkaline earth metal.

For example, in the case of the method (b), a sulfonated polystyrene is produced by: adding a mixed liquid of concentrated sulfuric acid and acetic anhydride to a solution of a polystyrene resin in 1,2-dichloroethane; and heating the mixture to cause them to react with each other for several hours. Next, the resultant is neutralized with the same number of moles of potassium hydroxide or sodium hydroxide as that of sulfonate groups, whereby a potassium salt or sodium salt of polystyrene sulfonic acid can be obtained.

A weight average molecular weight of the sulfonate group-containing aromatic vinyl-based resin is 1,000 to 300,000, preferably about 2,000 to 200,000. Note that the weight average molecular weight can be measured by gel permeation chromatography (GPC) method.

Examples of the organic carboxylic acid include perfluorocarboxylic acid, perfluoromethane carboxylic acid, perfluoroethane carboxylic acid, perfluoropropane carboxylic acid, perfluorobutane carboxylic acid, perfluoromethyl butane carboxylic acid, perfluorohexane carboxylic acid, perfluoroheptane carboxylic acid, and perfluorooctane carboxylic acid. Alkali metal salts or alkaline earth metal salts of those organic carboxylic acids are used. The alkali metal salts and alkaline earth metal salts are the same as the above-mentioned metal salts.

Of the organic alkali metal salts and organic alkali earth salts, sulfonic acid alkali metal salts, sulfonic acid alkaline earth metal salts, polystyrene sulfonic acid alkali metal salts, and polystyrene sulfonic acid alkaline earth metal salts are preferred.

One kind of the organic alkali metal salt compound and/or organic alkali earth salt compound may be used or two or more kinds of them may be used in combination.

The organic alkali metal salt compound and/or the organic alkaline earth metal salt compound as the component (D) must be incorporated into the PC resin composition of the present invention at a content of 0.03 to 1.0 part by mass with respect to 100 parts by mass of the composition composed of the aromatic PC resin as the component (A) and the glass filler as the component (B). When the content of the component (D) is less than 0.03 part by mass, the composition exerts flame retardancy to an insufficient extent. In addition, when the content exceeds 1.0 part by mass, it becomes difficult for the composition to maintain transparency. The content of the component (D) is preferably 0.05 to 0.4 part by mass, or more preferably 0.1 to 0.3 part by mass from the viewpoints of the exertion of the flame retardancy and the maintenance of the transparency.

Examples of the glossy particles as the component (E) in the PC resin composition of the present invention include mica, metal particles, metal sulfide particles, particles each having a surface coated with a metal or a metal oxide, and glass flakes each having a surface coated with a metal or a metal oxide.

Specific examples of the metal particles include metal powders each made of, for example, aluminum, gold, silver, copper, nickel, titanium, or stainless steel. Specific examples of the particles each having a surface coated with a metal or a metal oxide include metal oxide coating mica-based particles such as mica titanium coated with titanium oxide and mica coated with bismuth trichloride. Specific examples of the metal sulfide particles include metal sulfide powders each made of, for example, nickel sulfide, cobalt sulfide, or manganese sulfide. A metal used in each of the glass flakes each having a surface coated with a metal or a metal oxide is, for example, gold, silver, platinum, palladium, nickel, copper, chromium, tin, titanium, or silicon.

The glossy particles as the component (E) preferably have a volume average particle diameter of about 10 to 300 μm.

The above glossy particles as the component (E) are blended in an amount of 0.05 to 7.0 parts by mass, or preferably 0.5 to 5 parts by mass with respect to 100 parts by mass of the composition composed of the components (A) and (B). The case where the amount is less than 0.05 part by mass is not preferable because a metallic pattern as the external appearance of the surface of the PC resin composition is hardly formed. The case where the amount exceeds 7.0 parts by mass is not preferable either because the amount in which the glossy particles themselves emerge on the surface increases to impair the external appearance, and the flame retardancy of the PC resin composition reduces.

The above colorant as the component (F) is desirably free of opacifying property, and examples of the colorant include a methine-based dye, a pyrazolone-based dye, a perinone-based dye, an azo-based dye, a quinophthalone-based dye, and an anthraquinone-based dye.

The above colorant as the component (F) is blended in an amount of 0.0001 to 3.0 parts by mass, or preferably 0.1 to 3.0 parts by mass with respect to 100 parts by mass of the composition composed of the aromatic PC resin as the component (A) and the glass filler as the component (B). When the amount is less than 0.0001 part by mass, the PC resin composition cannot obtain a desired color tone. When the amount exceeds 3.0 parts by mass, the opacifying property of the colorant is strengthened, so the PC resin composition cannot obtain a metallic external appearance.

In addition to the components (A), (B), (C), (D), (E), and (F), an antioxidant, a UV absorber, a release agent, an antistatic agent, a fluorescent bleach, a silane coupling agent (when the surface of the glass filler is treated by the dry mixing method), and the like can be appropriately incorporated into the PC resin composition of the present invention as required to such an extent that the object of the present invention is not impaired.

As an antioxidant, phenol-based antioxidants and phosphorous-based antioxidants are preferably used.

Examples of the phenol-based antioxidants include triethylene glycol-bis[3-(3-tert-butyl-5-methyl-4-hydroxyphenyl)propionate], 1,6-hexanediol-bis[3-(3,5-di-tert-butyl-4-hydroxyphenyl)propionate], pentaerythritol-tetrakis[3-(3,5-di-tert-butyl-4-hydroxyphenyl)propionate], octadecyl-3-(3,5-di-tert-butyl-4-hydroxyphenyl)propionate, 1,3,5-trimethyl-2,4,6-tris(3,5-di-tert-butyl-4-hydroxybenzyl)benzene, N,N-hexamethylenebis(3,5-di-tert-butyl-4-hydroxy-hydrocinnamide), 3,5-di-tert-butyl-4-hydroxybenzylphosphonate diethyl ester, tris(3,5-di-tert-butyl-4-hydroxybenzyl)isocyanurate, and 3,9-bis{1,1-dimethyl-2-[β-(3-tert-butyl-4-hydroxy-5-methylphenyl)propionyloxy]ethyl}-2,4,8,10-tetraoxaspiro(5,5)undecane.

Examples of the phosphorous-based antioxidants include triphenylphosphite, trisnonylphenylphosphite, tris(2,4-di-tert-butylphenyl)phosphite, tridecylphosphite, trioctylphopshite, trioctadecylphosphite, didecylmonophenyl phosphite, dioctylmonophenyl phosphite, diisopropylmonophenyl phosphite, momobutyldiphenyl phosphite, monodecyldiphenyl phosphite, monooctyldiphenyl phosphite, bis(2,6-di-tert-butyl-4-methylphenyl)pentaerythritol diphosphite, 2,2-methylenebis(4,6-di-tert-butylphenyl)octyl phosphite, bis(nonylphenyl)pentaerythritol diphosphite, bis(2,4-di-tert-butylphenyl)pentaerythritol diphosphite, and distearyl pentaerythritol diphosphite.

One kind of those antioxidants may be used alone, or two or more kinds of them may be used in combination. Such antioxidant is typically added in an amount of about 0.05 to 1.0 part by mass with respect to 100 parts by mass of the composition composed of the aromatic PC resin as the component (A) and the glass filler as the component (B).

As the UV absorber, benzotriazole-based UV absorber, triazine-based UV absorber, benzooxazine-based UV absorber, and benzophenone-based UV absorber may be used.

Examples of the benzotriazole-based UV absorber include 2-(2'-hydroxy-5'-methylphenyl)benzotriazole, 2-(2'-hydroxy-3'-(3,4,5,6-tetrahydrophthal imide methyl)-5'-methyphenyl)benzotriazole, 2-(2'-hydroxy-3',5'-di-tert-butylphenyl)benzotriazole, 2-(2'-hydroxy-5'-tert-octylphenyl)benzotriazole, 2-(3'-tert-butyl-5'-methyl-2'-hydroxyphenyl)-5-chlorobenzotriazole, 2,2'-methylenebis(4-(1,1,3,3-tetramethylbutyl)-6-(2H-benzotriazole-2-yl)phenol), 2-(2'-hydroxy-3',5'-bis(α,α-dimethylbenzyl)phenyl)-2H-benzotriazole, 2-(3',5'-di-tert-amyl-2'-hydroxyphenyl)benzotriazole, and 5-trifluoromethyl-2-(2-hydroxy-3-(4-methoxy-α-cumyl)-5-tert-butylphenyl)-2H-benzotriazole.

Of those, 2-(2'-hydroxy-5'-tert-octylphenyl)benzotriazole is preferred.

As the triazine-based UV absorber, TINUVIN 400 (product name) (manufactured by Ciba Specialty Chemicals Inc.) which is a hydroxyphenyl triazine-based UV absorber is preferred. Examples of the benzooxazine-based UV absorber include 2-methyl-3,1-benzooxazine-4-one, 2-butyl-3,1-benzooxazine-4-one, 2-phenyl-3,1-benzooxazine-4-one, 2-(1- or 2-naphthyl)-3,1-benzooxazine-4-one, 2-(4-biphenyl)-3,1-benzooxazine-4-one, 2,2'-bis(3,1-benzooxazine-4-one), 2,2'-p-phenylenebis(3,1-benzooxazine-4-one), 2,2'-m-phenylenebis(3,1-benzooxazine-4-one), 2,2'-(4,4'-diphenylene)bis(3,1-benzooxazine-4-one), 2,2'-(2,6- or 1,5-naphthalene)bis(3,1-benzooxazine-4-one), and 1,3,5-tris(3,1-benzooxazine-4-one-2-yl)benzene. Of those, 2,2'-p-phenylenebis(3,1-benzooxazine-4-one) is preferred.

Examples of the benzophenone-based UV absorber include 2-hydroxy-4-methoxybenzophenone, 2-hydroxy-4-n-octoxy benzophenone, 2-hydroxy-4-methoxy-2'-carboxybenzophenone, 2,4-dihydroxybenzophenone, and 2,2'-dihydroxy-4-methoxy benzophenone. Of those, 2-hydroxy-4-n-octoxybenzophenone is preferred.

One kind of those UV absorbers may be used alone, or two or more kinds of them may be used in combination. Such UV absorber is typically added in an amount of about 0.05 to 2.0 part by mass with respect to 100 parts by mass of the composition composed of the component (A) and the component (B).

A higher fatty acid ester of a monohydric or polyhydric alcohol can be used as the release agent. Such higher fatty acid ester is preferably a partial or complete ester of a monohydric or polyhydric alcohol having 1 to 20 carbon atoms and a saturated fatty acid having 10 to 30 carbon atoms. Examples of the partial ester or the complete ester of a monohydric or polyhydric alcohol and the saturated fatty acid include monoglyceride stearate, monosorbitate stearate, monoglyceride behenate, pentaerythritol monostearate, pentaerythritol tetrastearate, propyleneglycol monostearate, stearyl stearate, palmityl palmitate, butyl stearate, methyl laurate, isopropyl palmitate, and 2-ethylhexyl stearate. Of those, monoglyceride stearate and pentaerythritol tetrastearate are preferably used.

One kind of those release agents may be used alone, or two or more kinds of them may be used in combination. Such release agent is typically added in an amount of about 0.1 to 5.0 part by mass with respect to 100 parts by mass of the composition composed of the aromatic PC resin as the component (A) and the glass filler as the component (B).

As the antistatic agent, for example, a monoglyceride of the fatty acid having 14 to 30 carbon atoms, and more specifically, monoglyceride stearate, monoglyceride palmitate, or a polyamide polyether block copolymer may be used.

As the fluorescent bleach, for example, stilbene-based, benzoimidazole-based, naphthalimide-based, rhodamine-based, coumarin-based, and oxazine-based compounds are exemplified. More specifically, commercially-available products such as UVITEX (product name, manufactured by Ciba Specialty Chemicals Inc.), OB-1 (product name, manufactured by Eastman Chemical Company.), TBO (product name, manufactured by SUMITOMO SEIKA CHEMICALS CO., LTD.), Kcoll (product name, manufactured by NIPPON SODA CO., LTD.), Kayalight (product name, manufactured by NIPPON KAYAKU CO., LTD.), and Leucophor EGM (product name, manufactured by Clariant Japan) may be used.

Note that the compounds exemplified above can be used as a silane coupling agent.

A method of preparing the PC resin composition of the present invention is not particularly limited, and a conventionally known method can be adopted. To be specific, the composition can be prepared by: blending the aromatic PC resin as the component (A), the glass filler as the component (B), the reactive functional group-containing silicone compound as the component (C), the organic alkali metal salt compound and/or the organic alkaline earth metal salt compound as the component (D), the glossy particles as the component (E), the colorant as the component (F), and the above various arbitrary components to be used as required at a predetermined ratio; and kneading the mixture.

The blending and the kneading are performed by a method using, for example, a ribbon blender and a drum tumbler for a preparing mixing, a Henschel mixer, a Banbury mixer, a single-screw extruder, a twin-screw extruder, a multi-screw extruder, and a cokneader. Heating temperature in melt-kneading is appropriately selected generally from a range of about 240 to 300° C.

It should be noted that any component to be incorporated other than the aromatic PC resin can be melted and kneaded with part of the aromatic PC resin in advance before being added: the component can be added as a master batch.

The PC resin composition of the present invention thus prepared has a flame retardancy determined by evaluation for flame retardancy in conformance with UL94 of 1.5 mmV-0, so the composition has excellent flame retardancy. It should be noted that a flame retardancy evaluation test is described later.

Next, a PC resin molded article of the present invention is described.

The PC resin molded article of the present invention is obtained by molding the above-mentioned PC resin composition of the present invention. Upon molding, the thickness of the PC resin composition is preferably about 0.3 to 10 mm, and is appropriately selected from the range depending on an application of the molded article.

A method of producing the PC resin molded article of the present invention is not particularly limited, and any one of the various conventionally known molding methods such as an injection molding method, an injection compression molding method, an extrusion molding method, a blow molding method, a press molding method, a vacuum molding method, and a foam molding method can be employed; injection molding at a mold temperature of 120° C. or higher is preferable, and injection molding at a mold temperature of 120° C. to 140° C. is more preferable. In this case, a resin temperature in the injection molding is typically about 240 to 300° C., or preferably 260 to 280° C.

Injection molding at a mold temperature of 120° C. or higher, or preferably 120° C. to 140° C. provides, for example, the following merit: the glass filler sinks, so the molded article can obtain a good external appearance. The mold temperature is more preferably 125° C. or higher and 140° C. or lower, or still more preferably 130° C. to 140° C.

The PC resin composition of the present invention as a molding raw material is preferably pelletized by the melting kneading method before being used.

It should be noted that gas injection molding for the prevention of sink marks in the external appearance of the molded article or for a reduction in weight of the molded article can be adopted as an injection molding method.

The optical properties of the PC resin molded article of the present invention thus obtained are desirably as follows: the molded article has a total light transmittance for visible light of 40% or more, or preferably 42% or more, and a 60° specular gloss of typically 80 or more, or preferably 85 or more. It should be noted that methods of measuring the optical properties will be described later.

In addition, the present invention provides a method of producing a PC resin molded article characterized by including subjecting the above-mentioned PC resin composition of the present invention to injection molding at a mold temperature of 120° C. or higher, or preferably 120 to 140° C. to produce a molded article having a thickness of preferably 0.3 to 10 mm.

The PC resin composition of the present invention contains the glass filler having a refractive index equal or close to that of the aromatic PC resin, is excellent in, for example, transparency, mechanical strength, impact resistance, and heat resistance, and is provided with high flame retardancy. The PC resin molded article of the present invention obtained by using the composition is excellent in, for example, transparency, flame retardancy, mechanical strength, impact resistance, and heat resistance.

The PC resin molded article of the present invention is preferably used for the following items, for example:
(1) various parts of televisions, radio cassettes, video cameras, videotape recorders, audio players, DVE players, air conditioners, portable phones, displays, computers, resistors, electric calculators, printers, and facsimiles, and electrical/electronic device parts such as outside plates and housing materials;
(2) parts for precision apparatuses such as cases and covers of precision apparatuses such as PDA's, cameras, slide projectors, clocks, gages, display apparatuses;

(3) parts for automobiles such as automobile interior materials, exterior products, and automobile body parts including instrument panels, upper garnishes, radiator grills, speaker grills, wheel covers, sunroofs, head lump reflectors, door visors, spoilers, rear windows, and side windows; and
(4) parts for furniture such as chairs, tables, desks, blinds, lighting covers, and interior instruments.

EXAMPLES

Hereinafter, the present invention is described in more detail by way of examples and comparative examples, but the present invention is not limited thereto.

It should be noted that a test piece was molded out of a PC resin composition pellet obtained in each example as described below, and was evaluated for various properties.

(1) Mechanical Properties

A pellet was subjected to injection molding with a 100-t injection molding machine [manufactured by TOSHIBA MACHINE CO., LTD., device name "IS100E"] at a mold temperature of 130° C. and a resin temperature of 280° C., whereby respective test pieces each having a predetermined form were produced.

The tensile properties (breaking strength and breaking elongation) of each test piece were measured in conformance with ASTM D638, and the flexural properties (flexural strength and flexural modulus) of the test piece were measured in conformance with ASTM 790. In addition, the Izod impact strength of the test piece was measured in conformance with ASTM D256, the deflection temperature of the test piece was measured in conformance with ASTM D648, and the specific gravity of the test piece was measured in conformance with ASTM D792.

(2) Flame Retardancy

A pellet was subjected to injection molding with a 45-t injection molding machine [manufactured by TOSHIBA MACHINE CO., LTD., device name "IS45PV"] at a mold temperature of 130° C. and a resin temperature of 280° C., whereby a test piece measuring 127×12.7×1.5 mm was produced. The flame retardancy of the test piece was measured in conformance with Underwriters Laboratories Subject 94 (UL94).

(3) Optical Properties

A pellet was subjected to injection molding with an 80-t injection molding machine [manufactured by Komatsu Ltd., device name "FK80HG"] at a mold temperature of 130° C. and a resin temperature of 280° C., whereby a test piece measuring 12.7×127×0.4 mm was produced. The total light transmittance of the test piece in a visible light region of 380 to 780 nm was measured with a spectrophotometer [manufactured by Hitachi, Ltd., device name "U-4100"] in conformance with JIS K 7105.

The 60° specular gloss of the test piece was measured with a glossmeter in conformance with JIS K 7105.

That is, a specular gloss is calculated on the basis of the gloss of a standard plane and a specular reflected luminous flux from the standard plane by the following procedure with a glossmeter [manufactured by NIPPON DENSHOKU INDUSTRIES CO., LTD., device name "VGS-Σ901"] in conformance with JIS K 7105: a luminous flux having a specific angle of aperture is caused to be incident on a sample plane at a specific angle of incidence and a luminous flux having a specific angle of aperture reflected in a specular reflection direction, i.e., the specular reflected luminous flux is measured with a photo detector. The 60° specular gloss is obtained by setting the angle of incidence in this case to 60±0.2°.

In addition, the kinds of the respective components used in the production of each PC resin composition pellet are shown below.

(1) PC resin; bisphenol A polycarbonate having a viscosity average molecular weight of 19,000 [manufactured by Idemitsu Kosan Co., Ltd., trade name "TARFLON FN1900A", refractive index 1.585]

(2) Refractive index-improved GF1; glass fibers each composed of a chopped strand having a refractive index of 1.585 and measuring ϕ 13 μm×3 mm [manufactured by ASAHI FIBER GLASS Co., Ltd., glass composition: $SiO_2$ 57.5% by mass, $Al_2O_3$ 12.0% by mass, CaO 21.0% by mass, $TiO_2$ 5.0% by mass, MgO 2.5% by mass, ZnO 1.5% by mass, $Na_2O+K_2O+Li_2O$=0.5% by mass]

(3) Refractive index-improved GF2; milled fibers obtained by milling the glass fibers each composed of a chopped strand having a refractive index of 1.585 and measuring ϕ 13 μm×3 mm [manufactured by ASAHI FIBER GLASS Co., Ltd., glass composition is the same as the item (2)]

(4) GF1; glass fibers each composed of a chopped strand which is made of an E glass having a refractive index of 1.555 and measuring ϕ 13 μm×3 mm [manufactured by ASAHI FIBER GLASS Co., Ltd., trade name "03MA409C", glass composition: $SiO_2$ 55.4% by mass, $Al_2O_3$ 14.1% by mass, CaO 3.2% by mass, $B_2O_3$ 6.0% by mass, MgO 0.4% by mass, $Na_2O+K_2O+Li_2O$=0.7% by mass, $Fe_2O_3$ 0.2% by mass, $F_2O$ 0.6% by mass]

(5) GF2; glass fibers each composed of a chopped strand which is made of an ECR glass having a refractive index of 1.579 and measuring ϕ 13 μm×3 mm [manufactured by ASAHI FIBER GLASS Co., Ltd., glass composition: $SiO_2$ 58.0% by mass, $Al_2O_3$ 11.4% by mass, CaO 22.0% by mass, $TiO_2$ 2.2% by mass, MgO 2.7% by mass, ZnO 2.7% by mass, $Na_2O+K_2O+Li_2O$=0.8% by mass, $Fe_2O_3$ 0.2% by mass]

(6) Stabilizer 1; an antioxidant containing octadecyl 3-(3,5-di-tert-butyl-4-hydroxyphenyl)propionate [manufactured by Ciba Specialty Chemicals Inc., trade name "Irganox 1076"]

(7) Stabilizer 2; an antioxidant containing tris(2,4-di-tert-phenyl)phosphite [manufactured by Ciba Specialty Chemicals Inc., trade name "Irgafos 168"]

(8) Release agent; pentaerythritol tetrastearate [manufactured by RIKEN VITAMIN CO., LTD., trade name "EW440A"]

(9) Frame retardant 1; potassium perfluorobutane sulfonate [manufactured by DAINIPPON INK AND CHEMICALS., trade name "Megafac F114"]

(10) Flame retardant 2; a 30% by mass aqueous solution of sodium polystyrene sulfonate having a weight average molecular weight of 20,000 and a sulfonation ratio of 100% [manufactured by Lion Corporation, trade name "LEOSTAT FRPSS-N430"]

(11) Flame retardant assistant 1; a reactive silicone compound having a refractive index of 1.51 and having a vinyl group and a methoxy group as functional groups [manufactured by Shin-Etsu Chemical Co., Ltd., trade name "KR-219"]

(12) Flame retardant assistant 2; a reactive silicone compound having a refractive index of 1.49 and having a vinyl group and a methoxy group as functional groups [manufactured by Dow Corning Corporation, trade name "DC3037"]

(13) Flame retardant assistant 3; polytetrafluoroethylene resin [manufactured by ASAHI GLASS CO., LTD., trade name "CD076"]

(14) Glossy particles 1; glass flake coated with titanium oxide [manufactured by Nippon Sheet Glass Co., Ltd., trade name "MC1030RS"]

(15) Glossy particles 2: glass flake coated with titanium oxide and silicone oxide [manufactured by MERCK, trade name "Miraval 5411"]
(16) Glossy particles 3: aluminum foil coated with a coloring material [manufactured by Nihonboshitsu Co., Ltd., trade name "Astroflake"]
(17) Colorant 1; anthraquinone-based orange dye [manufactured by Mitsubishi Chemical Corporation., trade name "Dia Resin Orange HS"]
(18) Colorant 2; anthraquinone-based green dye [manufactured by Sumitomo Chemical Co., Ltd., trade name "Sumiplast green G"]

Examples 1 to 7 and Comparative Examples 1 to 9

In each of the examples and the comparative examples, the respective components were mixed at a blending ratio shown in Table 1, and the mixture was melted and kneaded with a biaxial extruder [manufactured by TOSHIBA MACHINE CO., LTD., device name "TEM-35B"] at 280° C., whereby a PC resin composition pellet was produced.

A test piece was molded out of each pellet as described above, and its mechanical properties, flame retardancy, and optical properties were determined. Table 1 shows the results.

TABLE 1

|  |  | Example |  |  |  |  |
|---|---|---|---|---|---|---|
|  |  | 1 | 2 | 3 | 4 | 5 |
| PC resin composition (part(s) by mass) | (A) PC resin | 90 | 90 | 90 | 90 | 80 |
|  | (B) Refractive index-improved GF1 | 10 | 10 | 10 | 10 | — |
|  | (B) Refractive index-improved GF2 | — | — | — | — | 20 |
|  | (B) GF1 | — | — | — | — | — |
|  | (B) GF2 | — | — | — | — | — |
|  | Stabilizer 1 | 0.1 | 0.1 | 0.1 | 0.1 | 0.1 |
|  | Stabilizer 2 | 0.1 | 0.1 | 0.1 | 0.1 | 0.1 |
|  | Release agent | 0.8 | 0.8 | 0.8 | 0.8 | 0.8 |
|  | (D) Flame retardant 1 | 0.1 | 0.1 | 0.1 | 0.1 | 0.1 |
|  | (D) Flame retardant 2 | — | — | — | — | — |
|  | (C) Flame retardant assistant 1 | 0.3 | — | 0.3 | 0.3 | 0.3 |
|  | (C) Flame retardant assistant 2 | — | 0.5 | — | — | — |
|  | (C) Flame retardant assistant 3 | — | — | — | — | — |
|  | (E) Glossy particles 1 | 2 | 4 | — | — | — |
|  | (E) Glossy particles 2 | — | — | 1 | 3 | — |
|  | (E) Glossy particles 3 | — | — | — | — | 2 |
|  | (F) Colorant 1 | 0.1 | 0.1 | 0.1 | 0.1 | 0.1 |
|  | (F) Colorant 2 | 0.3 | 0.3 | 0.3 | 0.3 | 0.3 |
| Mechanical properties | Tensile breaking strength (MPa) | 80 | 80 | 80 | 80 | 80 |
|  | Tensile elongation (%) | 5 | 5 | 5 | 5 | 5 |
|  | Flexural strength (MPa) | 120 | 120 | 120 | 120 | 100 |
|  | Flexural modulus (MPa) | 3900 | 3900 | 3900 | 3900 | 3600 |
|  | Izod impact strength [with notches] (kJ/m$^2$) | 10 | 10 | 10 | 10 | 10 |
|  | Deflection temperature (° C.) | 141 | 141 | 141 | 141 | 141 |
|  | Specific gravity | 1.27 | 1.27 | 1.27 | 1.27 | 1.33 |
| Flame retardancy | UL-94 [test piece thickness: 1.5 mm] | V-0 | V-0 | V-0 | V-0 | V-0 |
| Optical properties [thickness 0.4 mm] | Total light transmittance (%) | 45 | 42 | 49 | 44 | 44 |
|  | 60° specular gloss | 91 | 88 | 90 | 87 | 88 |
| External appearance |  | Metallic | Metallic | Metallic | Metallic | Metallic |

|  |  | Example |  | Comparative Example |  |  |
|---|---|---|---|---|---|---|
|  |  | 6 | 7 | 1 | 2 | 3 |
| PC resin composition (part(s) by mass) | (A) PC resin | 60 | 80 | 80 | 80 | 80 |
|  | (B) Refractive index-improved GF1 | 40 | 20 | 20 | 20 | 20 |
|  | (B) Refractive index-improved GF2 | — | — | — | — | — |
|  | (B) GF1 | — | — | — | — | — |
|  | (B) GF2 | — | — | — | — | — |
|  | Stabilizer 1 | 0.1 | 0.1 | 0.1 | 0.1 | 0.1 |
|  | Stabilizer 2 | 0.1 | 0.1 | 0.1 | 0.1 | 0.1 |
|  | Release agent | 0.8 | 0.8 | 0.8 | 0.8 | 0.8 |
|  | (D) Flame retardant 1 | 0.1 | — | — | 0.1 | 0.1 |
|  | (D) Flame retardant 2 | — | 0.3 | — | — | — |
|  | (C) Flame retardant assistant 1 | — | 0.3 | — | — | — |
|  | (C) Flame retardant assistant 2 | — | — | — | — | — |
|  | (C) Flame retardant assistant 3 | — | — | — | — | 0.3 |
|  | (E) Glossy particles 1 | 2 | 3 | 2 | 2 | 2 |
|  | (E) Glossy particles 2 | — | — | — | — | — |
|  | (E) Glossy particles 3 | — | — | — | — | — |
|  | (F) Colorant 1 | 0.1 | 0.1 | 0.1 | 0.1 | 0.1 |
|  | (F) Colorant 2 | 0.3 | 0.3 | 0.3 | 0.3 | 0.3 |
| Mechanical properties | Tensile breaking strength (MPa) | 127 | 100 | 100 | 100 | 100 |
|  | Tensile elongation (%) | 2 | 4 | 4 | 4 | 4 |
|  | Flexural strength (MPa) | 180 | 140 | 140 | 140 | 140 |
|  | Flexural modulus (MPa) | 10800 | 5900 | 5900 | 5900 | 5900 |

TABLE 1-continued

|  |  |  |  |  |  |  |
|---|---|---|---|---|---|---|
|  | Izod impact strength [with notches] (kJ/m²) | 15 | 15 | 14 | 14 | 14 |
|  | Deflection temperature (° C.) | 144 | 143 | 142 | 142 | 142 |
|  | Specific gravity | 1.52 | 1.33 | 1.33 | 1.33 | 1.33 |
| Flame retardancy | UL-94 [test piece thickness: 1.5 mm] | V-0 | V-0 | V-2out | V-1 | V-0 |
| Optical properties [thickness 0.4 mm] | Total light transmittance (%) | 45 | 43 | 45 | 45 | 28 |
|  | 60° specular gloss | 91 | 88 | 91 | 91 | 67 |
| External appearance |  | Metallic | Metallic | Metallic | Metallic | Marble |

|  |  | Comparative Example |  |  |  |  |  |
|---|---|---|---|---|---|---|---|
|  |  | 4 | 5 | 6 | 7 | 8 | 9 |
| PC resin composition (part(s) by mass) | (A) PC resin | 80 | 80 | 80 | 80 | 80 | 80 |
|  | (B) Refractive index-improved GF1 | — | 20 | — | — | 20 | 20 |
|  | (B) Refractive index-improved GF2 | 20 | — | — | — | — | — |
|  | (B) GF1 | — | — | 20 | — | — | — |
|  | (B) GF2 | — | — | — | 20 | — | — |
|  | Stabilizer 1 | 0.1 | 0.1 | 0.1 | 0.1 | 0.1 | 0.1 |
|  | Stabilizer 2 | 0.1 | 0.1 | 0.1 | 0.1 | 0.1 | 0.1 |
|  | Release agent | 0.8 | 0.8 | 0.8 | 0.8 | 0.8 | 0.8 |
|  | (D) Flame retardant 1 | 0.1 | 0.1 | 0.1 | 0.1 | 1.5 | 0.01 |
|  | (D) Flame retardant 2 | — | — | — | — | — | — |
|  | (C) Flame retardant assistant 1 | 0.3 | 0.3 | — | — | 0.3 | 0.3 |
|  | (C) Flame retardant assistant 2 | — | — | — | — | — | — |
|  | (C) Flame retardant assistant 3 | — | — | 0.3 | 0.3 | 0.3 | — |
|  | (E) Glossy particles 1 | 10 | 4 | — | — | 2 | 2 |
|  | (E) Glossy particles 2 | — | — | — | — | — | — |
|  | (E) Glossy particles 3 | — | — | — | — | — | — |
|  | (F) Colorant 1 | 0.1 | 1 | 0.1 | 0.1 | 0.1 | 0.1 |
|  | (F) Colorant 2 | 0.3 | 3 | 0.3 | 0.3 | 0.3 | 0.3 |
| Mechanical properties | Tensile breaking strength (MPa) | 80 | 100 | 100 | 100 | 100 | 100 |
|  | Tensile elongation (%) | 5 | 4 | 4 | 4 | 4 | 4 |
|  | Flexural strength (MPa) | 100 | 140 | 140 | 140 | 140 | 140 |
|  | Flexural modulus (MPa) | 3600 | 5900 | 5900 | 5900 | 5900 | 5900 |
|  | Izod impact strength [with notches] (kJ/m²) | 14 | 14 | 14 | 14 | 14 | 14 |
|  | Deflection temperature (C.) | 142 | 142 | 142 | 142 | 142 | 142 |
|  | Specific gravity | 1.33 | 1.33 | 1.33 | 1.33 | 1.33 | 1.33 |
| Flame retardancy | UL-94 [test piece thickness: 1.5 mm] | V-1 | V-0 | V-0 | V-0 | V-0 | V-1 |
| Optical properties [thickness 0.4 mm] | Total light transmittance (%) | 26 | 32 | 7 | 18 | 32 | 45 |
|  | 60° specular gloss | 63 | 71 | 62 | 74 | 69 | 91 |
| External appearance |  | Marble | Marble | Marble | Marble | Marble | Metallic |

Table 1 shows the following.

Examples 1 to 7 show that, when a reactive functional group-containing silicone compound, an organic alkali metal salt compound, glossy particles, and a colorant are added to a composition composed of an aromatic PC resin and a glass filler having a refractive index smaller or larger than that of the PC resin by 0.002 or less, the resultant PC resin composition can be provided with excellent flame retardancy while maintaining its transparency with a metallic external appearance, strength, and heat resistance.

Comparative Examples 1 and 2 show that a resin composition composed of an aromatic PC resin, a glass filler having a refractive index smaller or larger than that of the PC resin by 0.002 or less, glossy particles, and a colorant, or a composition obtained by adding an organic metal salt compound to the resin composition can maintain its good metallic external appearance (having a total light transmittance of 40% or more and a 60° specular gloss of 80 or more), strength, and heat resistance, but cannot be provided with sufficient flame retardancy.

Comparative Example 3 shows that a composition obtained by adding a polytetrafluoroethylene resin as a flame retardant assistant to a resin composition composed of an aromatic PC resin, a glass filler having a refractive index smaller or larger than that of the PC resin by 0.002 or less, an organic metal salt compound, glossy particles, and a colorant can maintain its strength, heat resistance, and flame retardancy, but cannot be provided with a good metallic external appearance (having a total light transmittance of 40% or more and a 60° specular gloss of 80 or more).

Comparative Example 4 shows that, in the case of a resin composition composed of an aromatic PC resin, a glass filler having a refractive index smaller or larger than that of the PC resin by 0.002 or less, an organic metal salt compound, a reactive silicone, glossy particles, and a colorant, when the glossy particles are added in an excessively large amount, the composition can maintain its strength and heat resistance, but cannot be provided with sufficient flame retardancy and a good metallic external appearance (having a total light transmittance of 40% or more and a 60° specular gloss of 80 or more).

Comparative Example 5 shows that, in the case of a resin composition composed of an aromatic PC resin, a glass filler having a refractive index smaller or larger than that of the PC resin by 0.002 or less, an organic metal salt compound, a reactive silicone, glossy particles, and a colorant, when the colorant is added in an excessively large amount, the composition can maintain its strength, heat resistance, and sufficient flame retardancy, but cannot be provided with a good metallic external appearance (having a total light transmittance of 40% or more and a 60° specular gloss of 80 or more).

Comparative Examples 6 and 7 show that a composition obtained by adding a polytetrafluoroethylene resin as a flame retardant assistant to a resin composition composed of an aromatic PC resin, a glass filler made of the E glass (refractive index: 1.555) or the ECR glass (refractive index: 1.579), an organic metal salt compound, glossy particles, and a colorant can maintain its strength, heat resistance, and flame retardancy, but cannot be provided with a good metallic external appearance (having a total light transmittance of 40% or more and a 60° specular gloss of 80 or more).

Comparative Example 8 shows that, in the case of a resin composition composed of an aromatic PC resin, a glass filler having a refractive index smaller or larger than that of the PC resin by 0.002 or less, an organic metal salt compound, a reactive silicone, glossy particles, and a colorant, when the organic metal salt compound is added in an excessively large amount, the composition becomes opaque and can maintain its strength, heat resistance, and sufficient flame retardancy, but cannot be provided with a good metallic external appearance (having a total light transmittance of 40% or more and a 60° specular gloss of 80 or more).

Comparative Example 9 shows that, in the case of a resin composition composed of an aromatic PC resin, a glass filler having a refractive index smaller or larger than that of the PC resin by 0.002 or less, an organic metal salt compound, a reactive silicone, glossy particles, and a colorant, when the organic metal salt compound is added in an excessively small amount, the composition can maintain its strength, heat resistance, and metallic external appearance (having a total light transmittance of 40% or more and a 60° specular gloss of 80 or more), but cannot be provided with sufficient flame retardancy.

Industrial Applicability

The PC resin composition of the present invention contains the glass filler having a refractive index equal or close to that of the aromatic PC resin, the reactive silicone, the organic alkali metal salt compound and/or the organic alkaline earth metal salt compound, the glossy particles, and the colorant, is excellent in, for example, transparency, mechanical strength, impact resistance, and heat resistance, and is provided with high flame retardancy. The PC resin molded article of the present invention obtained by using the composition can suitably find applications in various fields.

The invention claimed is:

1. A polycarbonate resin composition comprising
    (A) 60 to 90 parts by mass of an aromatic polycarbonate resin and
    (B) 40 to 10 parts by mass of a glass filler having a refractive index smaller or larger than a refractive index of the aromatic polycarbonate resin by 0.002 or less,
    said polycarbonate resin composition further comprising, with respect to 100 total parts by mass of (A) and (B);
    (C) 0.05 to 2.0 parts by mass of a silicone compound having a reactive functional group,
    (D) 0.03 to 1.0 part by mass of an organic alkali metal salt compound and/or an organic alkaline earth metal salt compound,
    (E) 0.05 to 7.0 parts by mass of at least one glossy particle, and
    (F) 0.0001 to 3 parts by mass of a colorant;
    wherein the silicone compound (C) has a refractive index of 1.45 to 1.65,
    wherein the at least one glossy particle (E) comprises at least one selected from the group consisting of mica, a metal particle, a metal sulfide particle, a particle having a surface coated with a metal or a metal oxide, and a glass flake having a surface coated with a metal or a metal oxide, and
    wherein the compound (D) comprises at least one alkali metal salt compound and/or alkaline earth metal salt compound of a perfluoroalkanesulfonic acid represented by the following formula (2):

$(C_cF_{2c+1}SO_3)_dM$     (2)

wherein c represents an integer of 1 to 10, M represents an alkali metal or an alkaline earth metal, and d represents the valence of M.

2. The polycarbonate resin composition according to claim 1, wherein the glass filler (B) comprises a glass fiber and/or a milled fiber.

3. The polycarbonate resin composition according to claim 1, wherein the refractive index of the glass filler (B) is from 1.584 to 1.586.

4. The polycarbonate resin composition according to claim 1, wherein the silicone compound (C) has a refractive index of 1.48 to 1.60.

5. The polycarbonate resin composition according to claim 1, wherein the glass filler (B) is glass I or glass II, each having a composition as defined below:
    glass I comprises 50 to 60% by mass of silicone oxide ($SiO_2$), 10 to 15% by mass of aluminum oxide ($Al_2O_3$), 15 to 25% by mass of calcium oxide (CaO), 2 to 10% by mass of titanium oxide ($TiO_2$), 2 to 8% by mass of boron oxide ($B_2O_3$), 0 to 5% by mass of magnesium oxide (MgO), 0 to 5% by mass of zinc oxide (ZnO), 0 to 5% by mass of barium oxide (BaO), 0 to 5% by mass of zirconium oxide ($ZrO_2$), 0 to 2% by mass of lithium oxide ($LiO_2$), 0 to 2% by mass of sodium oxide ($Na_2O$), and 0 to 2% by mass of potassium oxide ($K_2O$), and has a total content of the lithium oxide ($LiO_2$), the sodium oxide ($Na_2O$), and the potassium oxide ($K_2O$) of 0 to 2% by mass; and
    glass II comprises 50 to 60% by mass of silicone oxide ($SiO_2$), 10 to 15% by mass of aluminum oxide ($Al_2O_3$), 15 to 25% by mass of calcium oxide (CaO), 2 to 5% by mass of titanium oxide ($TiO_2$), 0 to 5% by mass of magnesium oxide (MgO), 0 to 5% by mass of zinc oxide (ZnO), 0 to 5% by mass of barium oxide (BaO), 2 to 5% by mass of zirconium oxide ($ZrO_2$), 0 to 2% by mass of lithium oxide ($LiO_2$), 0 to 2% by mass of sodium oxide ($Na_2O$), and 0 to 2% by mass of potassium oxide ($K_2O$), be substantially free of boron oxide ($B_2O_3$), and has a total content of the lithium oxide ($LiO_2$), the sodium oxide ($Na_2O$), and the potassium oxide ($1_2O$) of 0 to 2% by mass.

6. The polycarbonate resin composition according to claim 5, wherein the glass filler (B) comprises less than 0.01% by mass of $Fe_2O_3$ as an impurity on an oxide basis.

7. The polycarbonate resin composition according to claim 5, wherein the glass filler (B) is glass I.

8. The polycarbonate resin composition according to claim 5, wherein the glass filler (B) is glass II.

9. A polycarbonate resin molded article obtained by a process comprising molding the polycarbonate resin composition according to claim 1.

10. The polycarbonate resin molded article according to claim 9, wherein the polycarbonate resin molded article is obtained by a process comprising injecting a molding at a mold temperature of 120° C. or higher.

11. The polycarbonate resin molded article according to claim 9, wherein the polycarbonate resin molded article has a 60° specular gloss of 80 or more and a total light transmittance for visible light of 40% or more.

12. The polycarbonate resin molded article according to claim 11, wherein the polycarbonate resin molded article has a 60° specular gloss of from 80 to 90.

13. The polycarbonate resin molded article according to claim 9, wherein the polycarbonate resin molded article has a flame retardancy determined by a flame retardancy evaluation method in conformance with UL94 of 1.5 mmV-0.

14. The polycarbonate resin molded article according to claim 9, wherein the polycarbonate resin molded article is obtained by a process comprising injecting a molding at a mold temperature of from 120° C. to 140° C.

15. The polycarbonate resin molded article according to claim 9, wherein the polycarbonate resin molded article has a total light transmittance for visible light of from 40 to 49%.

16. A method of producing a polycarbonate resin molded article, comprising subjecting the polycarbonate resin composition according to claim 1 to injection molding at a mold temperature of 120° C. or higher.

17. A method for producing a polycarbonate resin molded article, comprising subjecting the polycarbonate resin composition according to claim 1 to injection molding at a mold temperature of from 120 to 140° C.

* * * * *